Nov. 9, 1943.  A. F. DEBICKI  2,333,709
FASTENING MEANS FOR BILLIARD TABLE SLATES
Filed June 5, 1942
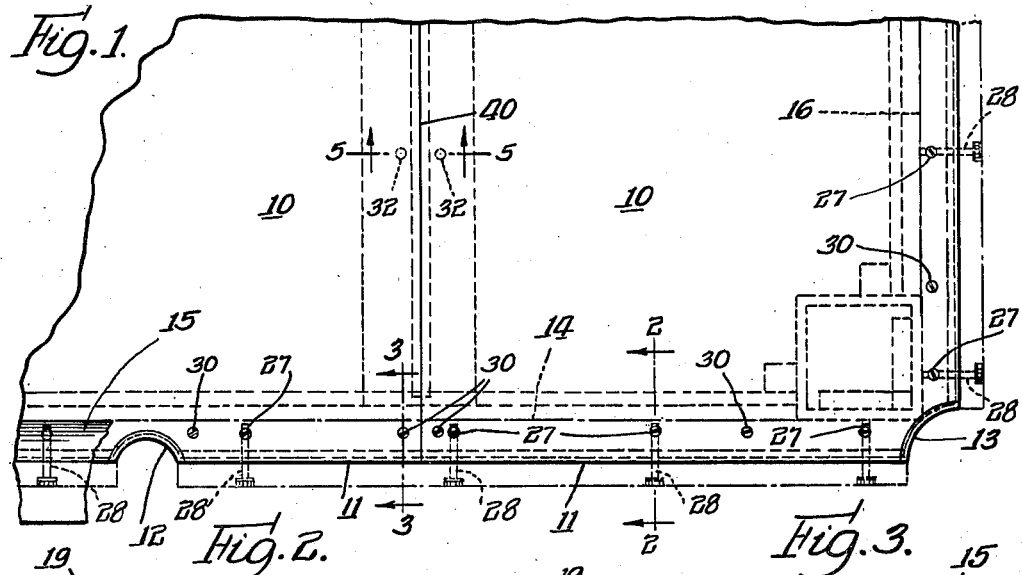
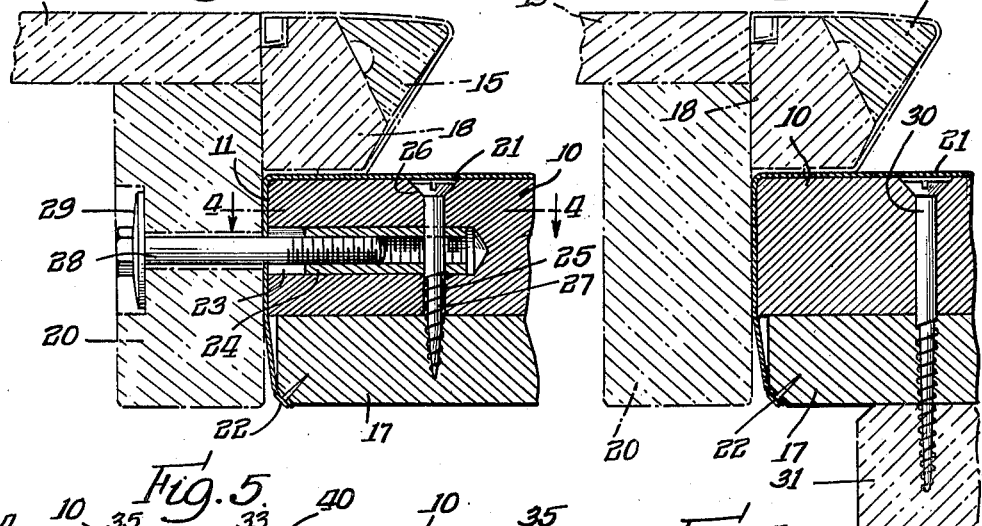
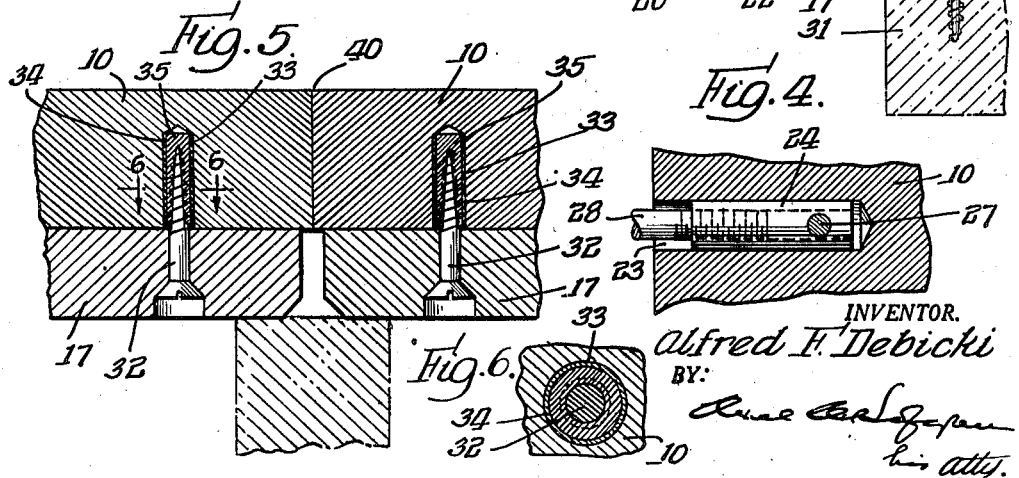
INVENTOR.
Alfred F. Debicki Patented Nov. 9, 1943

2,333,709

UNITED STATES PATENT OFFICE 2,333,709

FASTENING MEANS FOR BILLIARD TABLE SLATES

Alfred F. Debicki, Muskegon, Mich., assignor to The Brunswick-Balke-Collender Company, Chicago, Ill., a corporation of Delaware Application June 5, 1942, Serial No. 445,838

5 Claims. (Cl. 273—6)

This invention relates to the slate commonly employed as the bed of a billiard table and it is concerned principally with fastening means designed to engage the slate for connecting it with other parts of the billiard table structure.

One object of the invention is to provide new and improved fastening devices for connecting the slate or like material of a billiard table to other elements of the table structure.

Another object of the invention is to provide a fastening device in the nature of a nut and bolt in which the nut is embedded in the slate and retained therein without the use of molten lead or other plastic anchoring means.

A further object of the invention is to provide a billiard table slate bed with means for securing a rail to the edge of the bed comprising a threaded tube fitted into a bore in the edge of the slate and anchored therein by means of a cross-pin engaging the body of the slate.

More specifically it is an object of the invention to provide, in combination with a billiard table slate bed and a wooden support therefor, a fastening device which includes an internally threaded tube fitted into a bore extending into the edge of the slate and anchored by a transversely extending screw passing through the body of the tube and through the slate into the wooden supporting structure, whereby the anchoring screw for the tube serves also to secure the slate to the support, while the threaded tube acts as a nut for a bolt to fasten a rail member against the edge of the slate.

Other objects and advantages of the invention will appear from the following description taken in connection with the drawing, in which:

Figure 1 is a partial plan view showing the top surface of a billiard table slate bed in relation to the cushions and adjacent parts of the table and indicating the location of certain fastening means embodying this invention;

Figure 2 is a vertical detail section taken substantially as indicated at line 2—2 on Figure 1 but on a larger scale;

Figure 3 is a vertical detail section taken as indicated at line 3—3 on Figure 1 and also on a larger scale;

Figure 4 is a detail plan section taken as indicated at line 4—4 on Figure 2;

Figure 5 is a detail section taken as indicated at line 5—5 on Figure 1.

Figure 6 is a section taken as indicated at line 6—6 on Figure 5.

While the invention is susceptible of various modifications and alternative constructions, the embodiments shown in the drawing and described hereinafter are by way of preferred illustration only and it is not intended that the invention be limited thereto or thereby; but it is the intention to cover all modifications and alternative constructions falling within the spirit and scope of the invention as defined by the appended claims.

In the construction of billiard tables it is usual to employ panels of natural slate, or, in some cases, of a manufactured composition having some similar properties, to serve as the table bed, the upper surfaces of these panels being accurately planed and being covered with felt or like material, over which the balls roll in the course of the game. The slate panels are commonly supported on underlying wood panels or wood framing or both, and the laterally disposed resilient cushions and their supporting rail are attached to the edges of the slate bed panels. Figure 1 shows a corner and a portion of one side of the playing field or area of a billiard table as it would appear beofre application of the felt covering to the slate. Portions of two slate bed panels are shown at 10, 10, with their adjacent edges abutting and with their lateral edges 11, 11, in alignment. An arcuate opening 12 is formed in one edge of one of the panels for a side pocket, and an arcuate opening 13 is formed in the corner of the other panel for one of the corner pockets. The position of the innermost edge of the side cushion is denoted mainly in broken lines at 14 with a portion of the cushion shown in full lines at 15, and the position of the inner edge of the end cushion is indicated at 16 in broken lines.

Figure 2 shows a portion of the bed panel 10 resting upon a wooden supporting element 17 and indicates in broken outline the position of the cushion 15, cushion rail 18, top rail 19, and the so-called blind rail 20 which is attached to the edge of the slate panel 10. In this view the felt covering of the slate bed is shown at 21 with its edges secured by tacks 22 to the edge of the wooden supporting element 17.

To provide a fastening for the blind rail 20, which carries with it the cushion rail 18 and the top rail 19, a hole 23 is first bored into the edge 11 of the slate panel 10 and an internally threaded metallic tube 24 is inserted in the hole 23. A hole is then drilled in the slate at 25 extending vertically between its upper and lower faces and diametrically intersecting the hole 23. If preferred, the holes 23 and 25 may be drilled before insertion of the tube 24 and a transverse hole through the wall of the tube may be drilled therein either before the tube is inserted in the slate or afterwards, provided only that the transverse hole in the tube is made to register accurately with the hole 25 in the slate. The upper end of the hole 25 is counter-sunk at 26 to receive the head of a wood screw 27 which is inserted through the hole 25 and through the holes in the wall of the tube 24 with the lower threaded end of the screw engaging the wooden support 17. Thus the wood screw 27 serves both to anchor the sleeve or tube 24 in the slate and to secure the slate to the wooden support 17. The attachment of the so-called blind rail to the edge 11 of the slate bed is then completed by means of a bolt 28 threaded to engage the threads of the tube 24 and provided with a washer 29 under its head to bear against the blind rail 20.

In addition to the wood screws 27 there may be provided some longer screws 30, as shown in Figure 3, extending through the slate bed 10 and through the wooden member 17 into an additional wooden supporting member 31 disposed directly below the member 17. It will be understood that in situations where the location of a fastening bolt 28 for the blind rail would coincide with points at which the longer screws 30 are employed, such screws might serve as the anchoring means for threaded tubes 24 in the same manner as the screw 27 shown in Figure 2, in which event the screw 30 will perform three functions, namely: securing the slate to the support 17, securing the support 17 to the support 31, and anchoring tube 24 for a fastening bolt 28 in the slate. But, as indicated in Figures 2 and 3, the screws 27 and the screws 30 are both located substantially under the overhang of the cushion 15 so that any irregularity in the upper surface of the table produced by the presence of the heads of these screws will not affect the playing surface of the table since a ball can never roll onto this portion of the surface but will always strike the cushion before reaching this area.

The abutting edges of the panels 10, 10, denoted at 40 on Figure 1, extend across the playing field, so that it is not permissible adjacent these edges to provide fastening means which extend entirely through the slate because such means would impair the smoothness of the top surface. Therefore, adjacent the abutting edges, at 40, the slate is secured to the wooden supporting members 17 by means of screws 32 extending upwardly through said members 17. In each of the slate panels 10 a hole 33 is drilled from the bottom surface part way through the thickness of the slate panel and there is inserted in the hole 33 a snugly fitting tube 34 of vulcanized fibre or similar material having an outer surface adapted to engage the bore of the hole in the slate with a firm frictional grip. The tube 34 contains a filling of lead 35, or similar dense but readily deformable material, and a small axial hole is initially provided in this lead filling. Then when the point of the wood screw is entered in the hole in the lead, the screw forms its own thread in the lead and is driven "home" in the usual manner by means of a screwdriver to the proper depth for drawing the slate bed 10 firmly onto the wooden support 17. The tapered form of the wood screw 32 coupled with the fact that it occupies more space than that afforded by the initial small axial bore in the lead causes the lead to be deformed and somewhat expanded radially so as to exert pressure outwardly upon the tubular container 33 and thus increase the frictional grip of the tube 33 in the bore of the slate by slightly expanding the tube itself. This provides a thoroughly satisfactory anchorage for the screws 32 in the slate so that they will efficiently hold the slate in position on the support 17.

I claim:

1. In a billiard table a supporting member, a slate panel resting thereon, said panel having a bore extending horizontally inward from an edge of the panel, a threaded tube in said bore, a screw extending vertically through said tube and through the slate panel into the said support, and a bolt engaging the threaded tube for connecting the slate with another member of the table structure.

2. In a billiard table which includes a slate panel and a support on which it rests, said slate panel having a bore extending horizontally inward from an edge of the panel, an internally threaded member and an externally threaded member engageable therewith, one of said members being fitted into said bore, and a screw extending vertically through the slate panel into said support and intersecting the threaded member in said bore to anchor it in the slate, the other threaded member engaging another part of the table structure and connecting the slate thereto.

3. In a billard table which includes a slate panel, a support on which it rests, and a cushion overhanging the upper surface of the slate, said slate panel having a bore extending horizontally inward from an edge of the panel, an internally threaded member and an externally threaded member engageable therewith, one of said members being fitted into said bore and a screw disposed in the marginal area of the slate adjacent the cushion, extending vertically through the slate panel into said support and intersecting the threaded member in said bore to anchor it in the slate, the other threaded member engaging another part of the table structure and connecting the slate thereto.

4. In a billiard table, a supporting member, a slate panel resting thereon, said panel having a bore extending horizontally inward from an edge of the panel, an internally threaded member and an externally threaded member having their threaded portions inter-engaged, one of said members having a transverse hole extending through it, said member being fitted into the bore in the slate, an anchor disposed in said hole of the said member and extending downwardly through the slate into the support with which said anchor is positively engaged against movement in the direction of the axis of said hole, the other of said threaded members including a transaxial shoulder spaced outwardly from the edge of the slate panel engaging another part of the table structure and connecting the slate therewith.

5. In a billiard table, a supporting member, a slate panel resting thereon, said panel having a bore extending horizontally inward from an edge of the panel, an internally threaded member and an externally threaded member having their threaded portions inter-engaged, one of said members having a transverse hole extending through it, said member being fitted into the bore in the slate, an anchor disposed in said hole of the said member extending vertically in the slate and into said support, said anchor having a head at its upper end bearing against the slate and having positive engagement with the support which maintains said head in such bearing contact with the slate and thus anchors the slate to the support, the other of said threaded members having a shoulder spaced from the edge of the slate panel, and a table rail clamped between said shoulder and said edge.

ALFRED F. DEBICKI.